(12) United States Patent
Li et al.

(10) Patent No.: US 11,996,786 B2
(45) Date of Patent: May 28, 2024

(54) RESONANCE CONTROL METHOD FOR DIFFERENTIATED PHASE CORRECTION

(71) Applicant: Zhejiang University, Hangzhou (CN)

(72) Inventors: Wuhua Li, Hangzhou (CN); Ye Yan, Hangzhou (CN); Yuxiang Wang, Hangzhou (CN); Chushan Li, Hangzhou (CN); Wenxi Yao, Hangzhou (CN); Xiangning He, Hangzhou (CN); Youtong Fang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 219 days.

(21) Appl. No.: 17/770,462

(22) PCT Filed: Jan. 18, 2021

(86) PCT No.: PCT/CN2021/072439
§ 371 (c)(1),
(2) Date: Apr. 20, 2022

(87) PCT Pub. No.: WO2021/169666
PCT Pub. Date: Sep. 2, 2021

(65) Prior Publication Data
US 2022/0376633 A1    Nov. 24, 2022

(30) Foreign Application Priority Data
Feb. 25, 2020    (CN) .......................... 202010116771.2

(51) Int. Cl.
*H02M 7/48*    (2007.01)
*H02M 1/00*    (2006.01)
*H02M 7/5387*    (2007.01)

(52) U.S. Cl.
CPC ....... *H02M 7/4815* (2021.05); *H02M 1/0009* (2021.05); *H02M 7/53871* (2013.01)

(58) Field of Classification Search
CPC ........... H02M 7/4815; H02M 7/53871; H02M 1/0009
USPC ........................................... 363/98
See application file for complete search history.

(56) References Cited

U.S. PATENT DOCUMENTS

| | | | | |
|---|---|---|---|---|
| 7,816,901 | B2 * | 10/2010 | Wu | H02M 3/1584 323/284 |
| 2015/0207456 | A1 * | 7/2015 | Han | H02J 3/381 375/257 |
| 2018/0234007 | A1 * | 8/2018 | Xu | H02M 3/33523 |
| 2019/0068206 | A1 * | 2/2019 | Liao | H03L 7/0992 |

* cited by examiner

Primary Examiner — Yemane Mehari
(74) Attorney, Agent, or Firm — Muncy, Geissler, Olds & Lowe, P.C.

(57) ABSTRACT

A resonance control method for differentiated phase correction under asymmetric positive and negative bilateral frequency domains includes a differentiated phase correction resonance control link with an independent phase correction angle at each resonance point, a decoupling link and a delay compensation link. As a high power converter has the characteristic of asymmetric positive and negative bilateral frequency domains under resonance control with decoupling, stability margin of a control link is enhanced while a negative-sequence current suppression capability is realized by means of differentiated phase correction at positive and negative resonance poles.

4 Claims, 6 Drawing Sheets

RESONANCE CONTROL METHOD FOR DIFFERENTIATED PHASE CORRECTION

TECHNICAL FIELD

The present invention belongs to the technical field of power electronic control and in particular relates to a resonance control method for differentiated phase correction under asymmetric positive and negative bilateral frequency domains.

BACKGROUND

A three-phase high power converter, which serves as an energy conversion apparatus, is applied in industrial fields such as electrified traffic and marine electric power system on a daily broadening scale. The converter usually works in a low carrier wave ratio working condition and remarkable in control and modulation delay, and the stability margin of a control link is insufficient, which affects the suppression capability and the dynamic performance to a negative-sequence current.

Compared with proportion integration (PI) control under a synchronous coordinate system merely with a single resonance pole, a proportional resonance controller under the static coordinate system has a negative resonance pole which may suppress a negative sequence component of a current effectively. In addition, introduction of decoupling schemes such as a current state feedback similar to a synchronous coordinate system control scheme, the dynamic performance of the converter may be improved. Further, equivalent phase correction at conventional positive and negative resonance poles may be adopted to improve positive and negative phase margins at the low carrier wave ratio simultaneously.

By modeling and analyzing by means of a teaching tool with a complex transfer function, positive and negative bilateral frequency domains in the scheme have the asymmetrical characteristic. At the moment, equivalent phase correction merely with single phase correction positive degree of freedom may not meet a differentiated phase correction demand of positive and negative resonance poles simultaneously, so that it is limited to improve the stability margin.

Therefore, it is necessary to design a new solution. At the low carrier wave ratio, differentiated phase correction is performed on a resonance controller with asymmetrical positive and negative frequency domains while the negative-sequence current is suppressed, thereby improving the stability and dynamic performance of the system more effectively.

SUMMARY

In order to improve the dynamic performance of the high power converter with asymmetrical positive and negative bilateral frequency domains, the present invention provides a resonance control method for differentiated phase correction under asymmetric positive and negative bilateral frequency domains, including the following steps:

1) sampling a current of each phase in a controlled converter, performing abc/αβ coordinate transformation to obtain currents $i_\alpha$ and $i_\beta$ under a static coordinate system and defining a current sampling value $i_{\alpha\beta}=i_\alpha+ji_\beta$, wherein $i_\alpha$ and $i_\beta$ are respectively current values of an axis α and an axis β under the static coordinate system, $i_{\alpha\beta}$ is a complex vector and j is an imaginary unit;

2) subtracting the current sampling value $i_{\alpha\beta}$ from a current reference value $i_{\alpha\beta\_R}$ to obtain a current error $i_{\alpha\beta\_E}$;

3) taking the current error as an input of a resonance control link, and calculating a resonance output $m_{\alpha\beta\_R}$, wherein a calculating formula of the resonance control link is as follows:

$$m_{\alpha\beta\_R}=i_{\alpha\beta\_E}\cdot[K_p+K_{i1}\cdot e^{-j\theta_1}/(s+j\omega_0)+K_{i2}\cdot e^{j\theta_2}/(s-j\omega_0)] \quad \text{formula I}$$

wherein $K_p$ is a proportionality coefficient, $K_{i1}$ and $K_{i2}$ are respectively resonance coefficients of a negative resonance link and a positive resonance link, $\theta_1$ and $\theta_2$ are respectively phase correction angles of the negative resonance link and the positive resonance link, $\omega_0$ is a fundamental wave angular frequency and s is a Laplace operator;

4) taking the current sampling value $i_{\alpha\beta}$ as an input of a decoupling link, and calculating a decoupling output $m_{\alpha\beta\_D}$;

5) adding the resonance output $m_{\alpha\beta\_R}$ and the decoupling output $m_{\alpha\beta\_D}$ together to obtain $m_{\alpha\beta\_RD}$ as an input of a delay compensation link, and calculating a total output map of the control link; and 6) performing αβ/abc coordinate transformation on the total output map of the control link to obtain three phase modulating waves $m_a$, $m_b$ and $m_c$, and comparing the three phase modulating waves with carrier waves in a modulating and driving module to generate a driving signal to drive converting topology, thereby realizing electric energy conversion.

Further, the calculating formula of the decoupling link is as follows:

$$m_{\alpha\beta\_D}=i_{\alpha\beta}\cdot j\omega_0 L \quad \text{formula II}$$

wherein L is an inductance value on an alternating current side.

Further, the calculating formula of the delay compensation link is as follows:

$$m_{\alpha\beta\_R}=m_{\alpha\beta\_RD}\cdot e^{inT_s\cdot\omega_0}, \text{ or } m_{\alpha\beta}=m_{\alpha\beta\_RD}\cdot e^{inT_s\cdot\omega_0} \quad \text{formula III}$$

wherein n is a compensation coefficient and $T_s$ is a control period.

The present invention has the beneficial effects that

The system with resonance and decoupling control under the static coordinate system may suppress the negative-sequence current, is better in dynamic performance and has advantages, but has the characteristic that positive and negative bilateral frequency domains are asymmetrical. Compared with conventional equivalent phase correction that is applied more widely:

$$m_{\alpha\beta\_R}=i_{\alpha\beta\_E}\cdot[K_p+K_i\cdot(s\cdot\cos\theta+\omega_0\cdot\sin\theta)/(s^2+\omega_0^2)] \quad \text{formula VII}$$

differentiated phase correction shown in the formula I may expand phase correction positive angle control degree of freedom from only one θ to two independent $\theta_1$ and $\theta_2$, which may realize a more optimized control effect. The present invention combines the advantage of the system with resonance and decoupling control, conversion from the formula VII to the formula I and the advantage of the formula I relative to the formula VII under the condition that the frequency domains are asymmetrical, and improves the stability margin and the dynamic performance of the converter with asymmetrical positive and negative frequency domains by means of differentiated phase correction and decoupling control at different resonance poles, thereby obtaining a beneficial technical effect.

DETAILED DESCRIPTION

Detailed description on the objective, scheme and advantage of the present invention is made in combination with drawings and embodiments by taking current loop control of universal three-phase bridge type inverting topology as an example.

Figure 1:
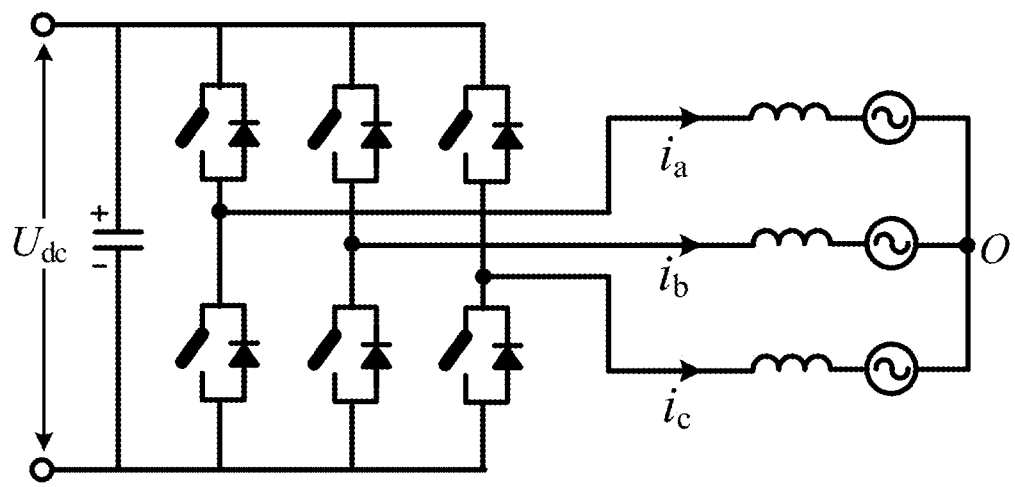
FIG. 1 is a schematic diagram of a power conversion circuit.
Figure 2:
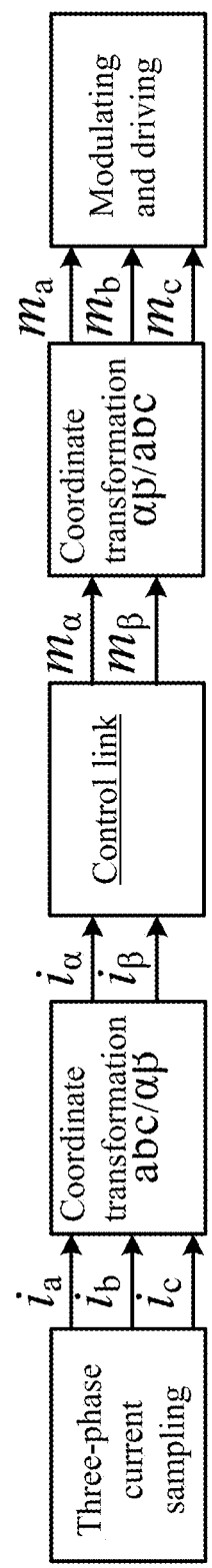
FIG. 2 is a total control block diagram.

FIG. 1 is a schematic diagram of a power conversion circuit, and FIG. 2 is a total control block diagram, wherein a three-phase current is sampled to obtain alternating current side currents $i_a$, $i_b$ and $i_c$, and abc/αβ coordinate transformation is performed to obtain currents $i_\alpha$ and $i_\beta$ under a static coordinate system as an input of a control link. Then, the control link outputs modulating waves $m_\alpha$ and $m_\beta$ under the static coordinate system, αβ/abc coordinate transformation is performed on the control link to obtain three phase modulating waves $m_a$, $m_b$ and $m_c$, and the three phase modulating waves are compared with carrier waves in a modulating and driving module to generate a driving signal to drive converting topology, thereby realizing electric energy conversion.

Figure 3:
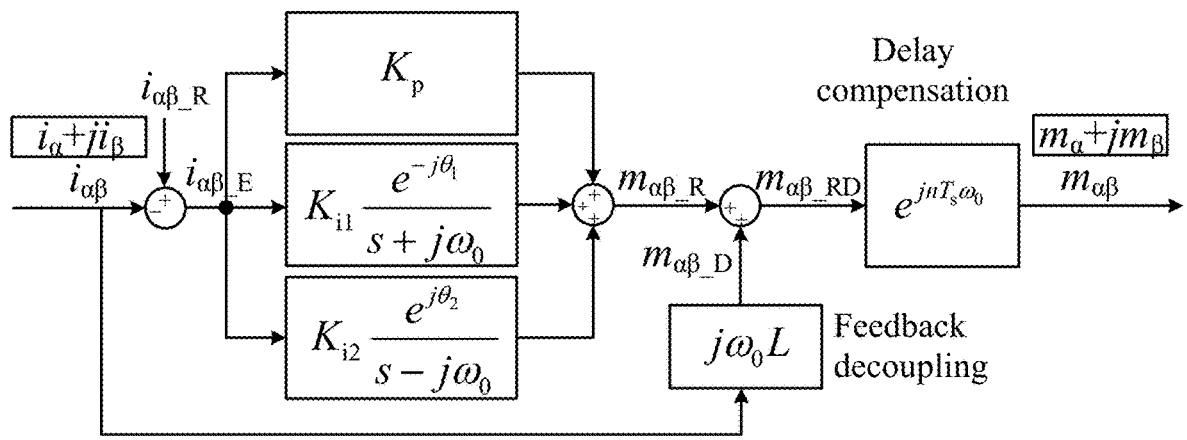
FIG. 3 is a block diagram of a control link with differentiated phase correction resonance control.

FIG. 3 is a specific realization block diagram of the control link, including a resonance control link, a feedback decoupling link and a delay compensation link. An expression mode of the complex vector and the complex transfer function is adopted herein and an implementation mode thereof in the real number field will be further described in the FIG. 4 subsequently. By taking a current sampling value $i_{\alpha\beta}$ under the static coordinate system as an example, the complex vector represents $i_\alpha + j i_\beta$, wherein j is an imaginary unit, $i_\alpha$ and $i_\beta$ respectively represent current values of an axis α and an axis β, and definitions of the rest complex vectors containing αβ in subscript are same.

The control link samples and obtains corresponding $i_{\alpha\beta}$ from a controlled object and outputs the modulating wave map to control the controlled object. The resonance control method for differentiated phase correction under asymmetric positive and negative bilateral frequency domains corresponding to the control link includes the following steps:

1) in the static coordinate system, the current sampling value $i_{\alpha\beta}$ is subtracted from a current reference value $i_{\alpha\beta\_R}$ to obtain a current error $i_{\alpha\beta\_E}$;

2) the current error $i_{\alpha\beta\_E}$ is calculated by the formula I corresponding to the differentiated phase correction resonance controller to obtain a resonance control link output $m_{\alpha\beta\_R}$:

$$m_{\alpha\beta\_R} = i_{\alpha\beta\_E}[K_p + K_{i1} \cdot e^{-j\theta_1}/(s+j\omega_0) + K_{i2} \cdot e^{j\theta_2}/(s-j\omega_0)] \quad \text{formula I}$$

wherein $K_p$ is a proportionality coefficient, $K_{i1}$ and $K_{i2}$ are respectively resonance coefficients of a negative resonance link and a positive resonance link, $\theta_1$ and $\theta_2$ are respectively phase correction angles of the negative resonance link and the positive resonance link, and $\omega_0$ is a fundamental wave angular frequency;

3) the current sampling value $i_{\alpha\beta}$ is calculated by the formula II corresponding to decoupling to obtain a decoupling output $m_{\alpha\beta\_D}$:

$$m_{\alpha\beta\_D} = i_{\alpha\beta} \cdot j\omega_0 L \quad \text{formula II}$$

the formula corresponds to the feedback decoupling scheme, wherein L is an inductance value on the alternating current side. In addition, the decoupling output $m_{\alpha\beta\_D}$ may further be obtained by obtained by the current reference value $i_{\alpha\beta\_R}$ via $m_{\alpha\beta\_D} = i_{\alpha\beta\_R} \cdot \omega_C/s + \omega_C \cdot e^{-sTd})$ or the current error value $i_{\alpha\beta\_E}$ via $m_{\alpha\beta\_D} = i_{\alpha\beta\_E} \cdot K_p j\omega_0/s$ and other decoupling schemes, wherein $\omega_C$ is an electric current loop bandwidth and $T_d$ is control and modulation delay;

4) the resonance output $m_{\alpha\beta\_R}$ and the decoupling output $m_{\alpha\beta\_D}$ are added together to obtain $m_{\alpha\beta\_RD}$;

5) $m_{\alpha\beta\_RD}$ may be directly taken as a total output $m_{\alpha\beta}$ of the control link or $m_{\alpha\beta\_RD}$ obtains the total output map of the control link via the formula III corresponding to the delay compensation link;

$$m_{\alpha\beta} = m_{\alpha\beta\_RD} \cdot e^{jnT_s\omega_0}, \text{ or } m_{\alpha\beta} = m_{\alpha\beta\_RD} \cdot e^{jnT_s\omega_0} \quad \text{formula III}$$

wherein the compensation coefficient n may be a typical value 1.5 or 0 or other any value, and $T_s$ is a control period.

The implementation mode of the complex vector in the real number field is described briefly below. The expression formula of the control link includes the imaginary unit j which represents cross coupling between the axis α and the axis β. The feedback decoupling link includes an item $j\omega_0 L$, wherein j is located in a numerator, i.e., $m_{\alpha\beta\_D} = i_{\alpha\beta} \cdot j\omega_0 L$, and its implementation mode in the real number field is as shown in (a) in FIG. 4:

$$m_{\alpha\_D} = i_\beta \cdot \omega_0 L, \; m_{\beta\_D} = i_\alpha \cdot \omega_0 L \quad \text{formula IV}$$

The resonance control link includes an item $1/(s\pm jw_0)$, wherein j is located in a denominator. By taking $y_{\alpha\beta} = u_{\alpha\beta}/(s-j\omega_0)$ as an example, its implementation mode in the real number field is as shown in (b) in FIG. 4:

$$y_\alpha = (u_\alpha - y_\beta/\omega_0)/s, \; y_\beta = (u_\beta + y_\alpha/\omega_0)/s \quad \text{formula V}$$

Figure 4:
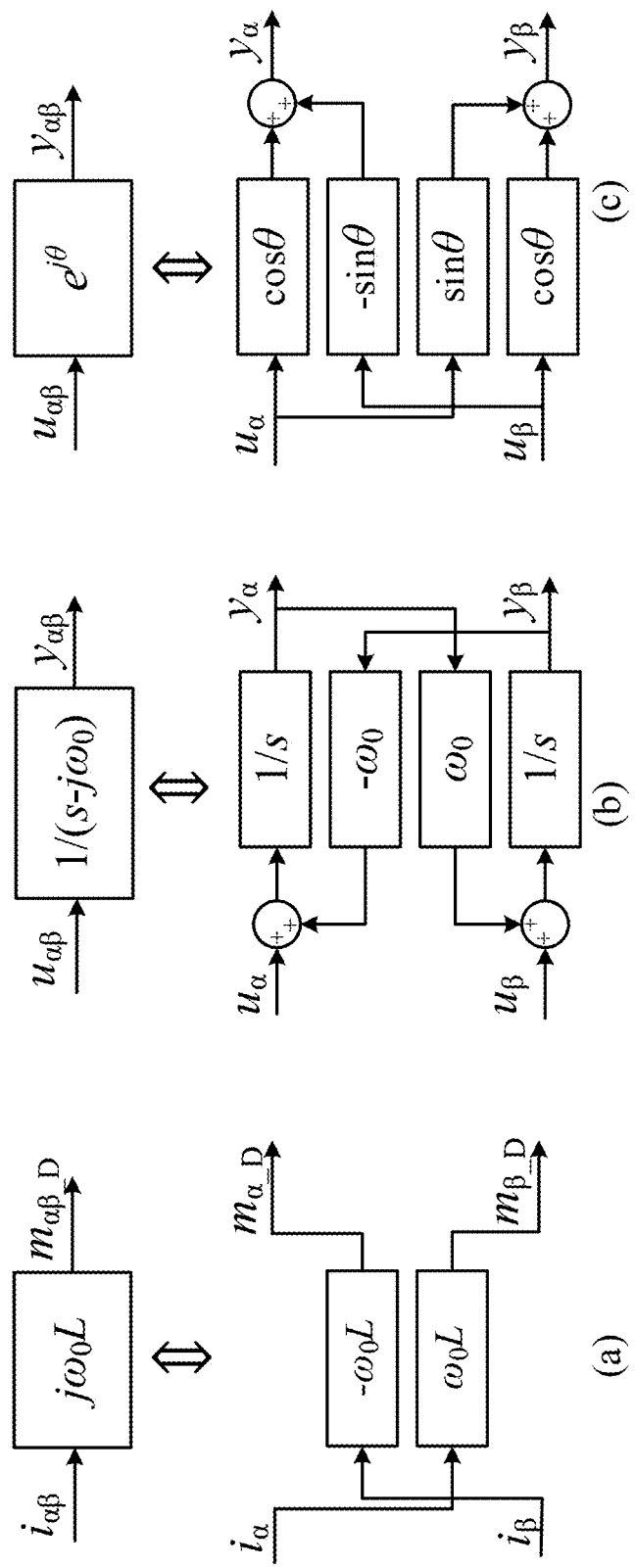
FIG. 4 is a block diagram of realizing a complex vector in the control link in a real number field.

In addition, the resonance controller link and the delay compensation link include an exponential function $e^{j\theta}$, and by taking $y_{\alpha\beta} = u_{\alpha\beta} \cdot e^{j\theta}$ as an example, its implementation mode in the real number field is as shown in (c) in the FIG. 4:

$$y_\alpha = u_\alpha \cdot \cos\theta - u_\beta \cdot \sin\theta, \; y_\beta = u_\alpha \cdot \sin\theta + u_\beta \cos\theta \quad \text{formula VI}$$

An application example of the present invention is given below.

For the three-phase power conversion circuit shown in FIG. 1, a universal control scheme is as follows: a three-phase current is sampled to obtain alternating current side currents $i_a$, $i_b$ and $i_c$, and abc/αβ coordinate transformation is performed to obtain currents $i_\alpha$ and $i_\beta$ under a static coordinate system as an input of a control link. The specific implementation process of the control link is the same as the above, including the resonance link corresponding to the formula I put by the present invention and the decoupling link shown in the formula III. The resonance link in the conventional scheme corresponds to the formula VII:

$$m_{\alpha\beta\_R} = i_{\alpha\beta\_E}[K_p + K_i \cdot (s \cdot \cos\theta + \omega_0 \cdot \sin\theta)/(s^2 + \omega_0^2)] \quad \text{formula VII}$$

Then, the control link outputs modulating waves $m_\alpha$ and $m_\beta$ under the static coordinate system, αβ/abc coordinate transformation is performed on the control link to obtain three phase modulating waves $m_a$, $m_b$ and $m_c$, and the three phase modulating waves are compared with carrier waves in a modulating and driving module to generate a driving signal to drive converting topology to realize electric energy conversion. When the three-phase converter adopts the decoupling and resonance control scheme, the frequency domains have positive and negative bilateral asymmetrical characteristic, shown in FIG. 5, i.e., the amplitude-frequency characteristic and the phase-frequency characteristic are not positively and negatively symmetrical about 0 Hz. In order to solve the problem of insufficient stability margin caused by the asymmetrical positive and negative bilateral frequency domains, compared with the conventional control scheme, the present invention is primarily improved that the scheme is the resonance link for differentiated phase correction corresponding to formula I, the conventional scheme is the resonance link for equivalent phase correction corresponding to the formula VII and only has one phase correction positive angle degree of freedom θ, and corresponding to the formula I for differentiated phase correction, $θ_1$ is only equal to $θ_2$. By introducing the resonance controller for differentiated phase correction with a multi-phase correction degree of freedom, differentiated phase correction angles $θ_1$ and $θ_2$ may be adopted.

Figure 5:
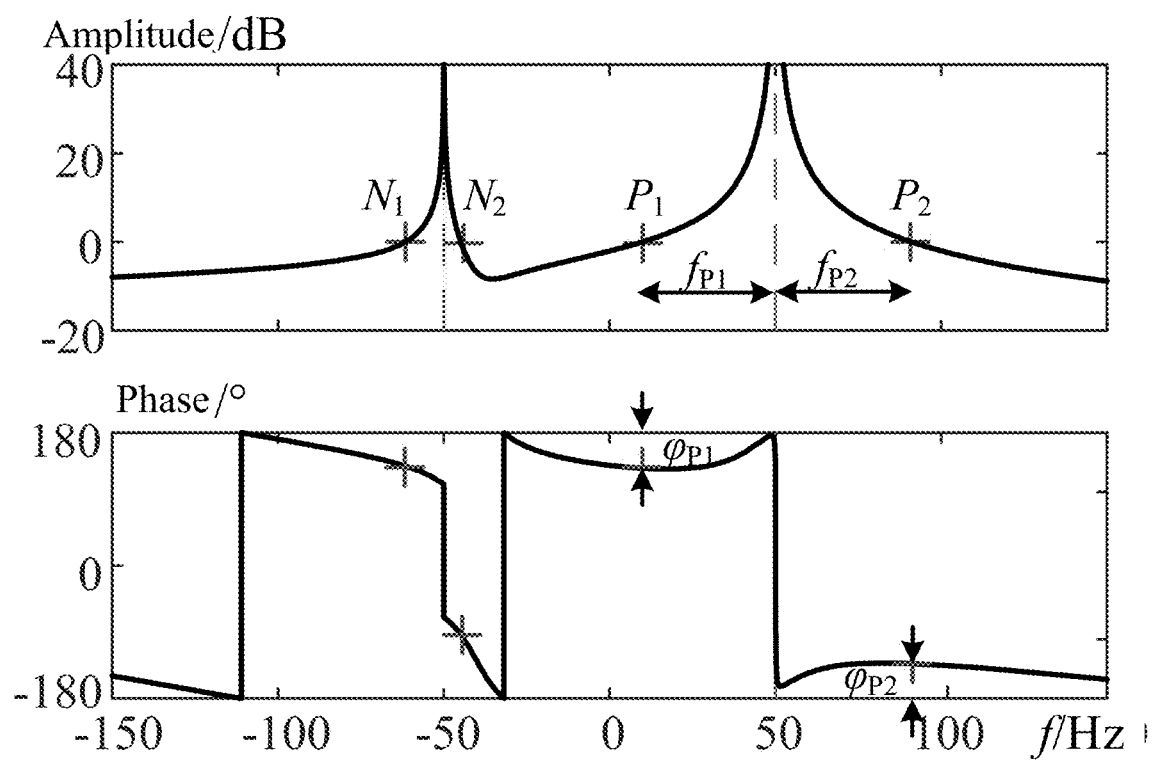
FIG. 5 is a bilateral frequency domain bode diagram of a system with differentiated phase correction resonance control.

The resonance control system for differentiated phase correction with asymmetrical positive and negative bilateral frequency domains is analyzed by means of a complex transfer function to obtain the bilateral frequency domain bode diagram shown in FIG. 5, and a comparison result between corresponding stability margin indexes such as cross-over frequency and phase margin and those in the conventional scheme is as shown in a table 1. It may be seen that the whole system has a harmonic peak of −50 Hz, which may suppress the negative sequence component of the current better. Compared with the conventional scheme, the cross-over frequency fcpi and the phase margin $φ_{P2}$ at the positive resonance pole and the phase margin $φ_{N1}$ at the negative resonance pole are improved obviously, for example, fcpi is improved by about one time, $φ_{P2}$ and $φ_{N1}$ are improved by about 50%, and the rest stability margin indexes are maintained in an optimized range.

TABLE 1

Comparison table between phase correction positive angle parameter and stability margin of the control link

| | $θ_1/°$ | $θ_2/°$ | $f_{CN1}$ | $f_{CN2}$ | $f_{CP1}$ | $f_{CP2}$ | $φ_{N1}/°$ | $φ_{N2}/°$ | $φ_{P1}/°$ | $φ_{P2}/°$ |
|---|---|---|---|---|---|---|---|---|---|---|
| Conventional scheme | −57.5 | 57.5 | $0.23 f_0$ | $0.10 f_0$ | $0.38 f_0$ | $0.92 f_0$ | 32 | 165 | 68.3 | 30.7 |
| The present invention | −120 | 14 | $0.23 f_0$ | $0.10 f_0$ | $0.80 f_0$ | $0.82 f_0$ | 45.1 | 87.4 | 48.1 | 47.2 |

Figure 6:
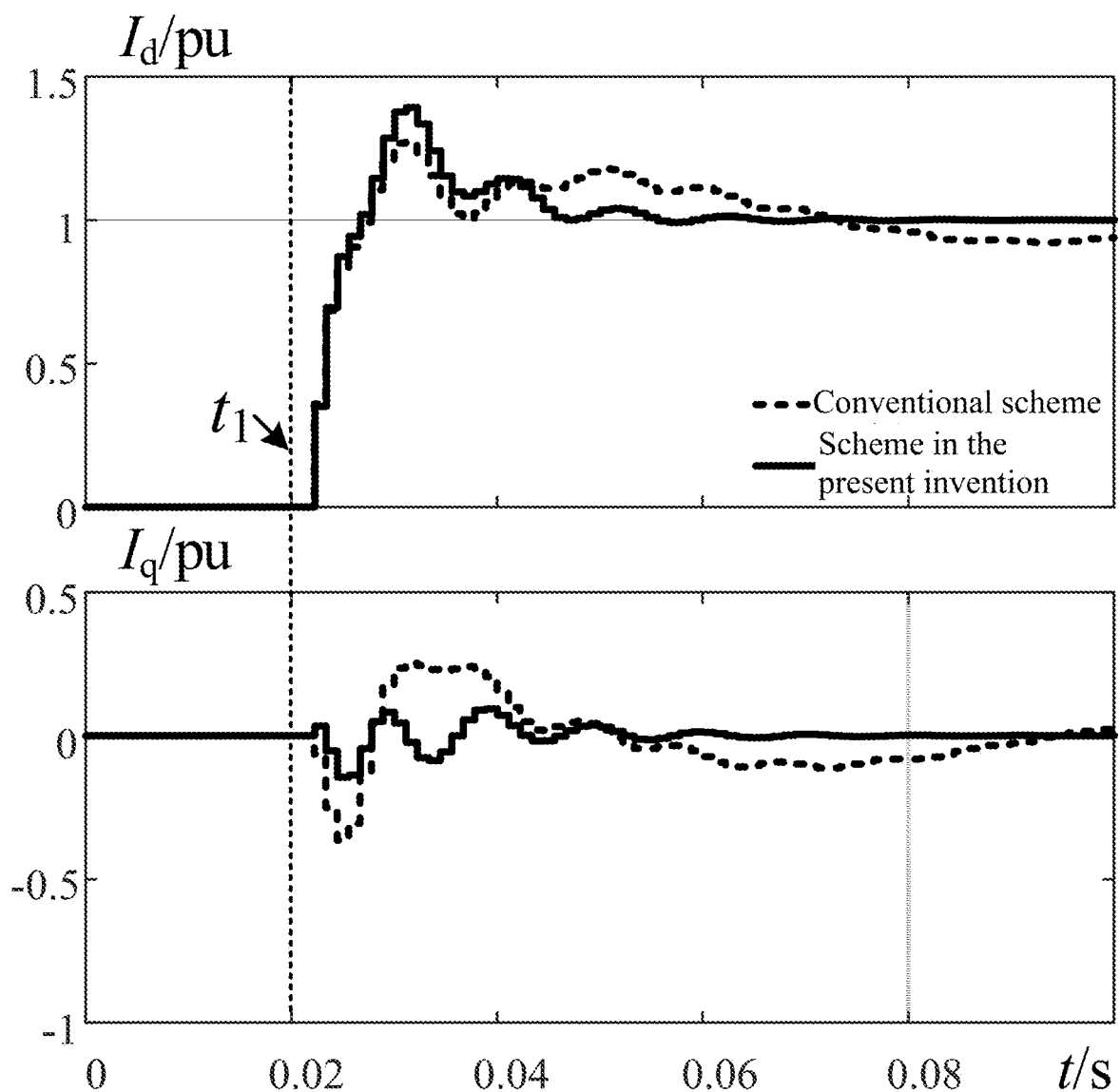
FIG. 6 is a transient current oscillograph under the synchronous coordinate system of the conventional scheme and the scheme of the present invention.

After a current index of the axis d is stepped from 0pu to 1pu at 0.02 s, a current waveform is as shown in FIG. 6. When the conventional scheme is used, under a dp coordinate system, the current represents a low oscillating component at 11 Hz and is slow to attenuate, and the restoration time reaches 0.144 s. After adopting the scheme of the patent, $I_q$ is attenuated to below 2% in 0.034 s.

Therefore, through the differentiated phase correction at different resonance poles, the stability margin and the dynamic performance of the converter with asymmetrical positive and negative frequency domains are improved, thereby obtaining a beneficial technical effect.

The present invention is not limited to the specific implementation mode. Those skilled in the art may adopt other various implementation modes according to the content of the present invention, for example, the feedback decoupling link is replaced by a feedforward decoupling link, two-level converting topology is replaced by three-level converting topology and the like. Therefore, claims aim to cover all variations in true concept and scope of the present invention.

What is claimed is:

1. A resonance control method for differentiated phase correction, comprising the following steps:

sampling a current of each phase in a controlled converter, performing abc/αβ coordinate transformation to obtain currents $i_α$ and $i_β$ under a static coordinate system and defining a current sampling value $i_{αβ}=i_α+ji_β$, wherein $i_α$ and $i_β$ are respectively current values of an axis α and an axis β under the static coordinate system, $i_{αβ}$ is a complex vector and j is an imaginary unit;

subtracting the current sampling value $i_{αβ}$ from a current reference value $i_{αβ\_R}$ to obtain a current error $i_{αβ\_E}$;

taking the current error as an input of a resonance control link, and calculating a resonance output map R, wherein a calculating formula of the resonance control link is as follows:

$$m_{αβ\_R}=i_{αβ\_E}\cdot[K_p+K_{i1}\cdot e^{-jθ_1}/(s+jω_0)+K_{i2}\cdot e^{jθ_2}/(s-jω_0)],$$

wherein $K_p$ is a proportionality coefficient, $K_{i1}$ and $K_{i2}$ are respectively resonance coefficients of a negative resonance link and a positive resonance link, $θ_1$ and $θ_2$ are respectively phase correction angles of the negative resonance link and the positive resonance link, $ω_0$ is a fundamental wave angular frequency and s is a Laplace operator;

taking the current sampling value $i_{αβ}$ as an input of a decoupling link, and calculating a decoupling output $m_{αβ\_D}$;

adding the resonance output $m_{αβ\_R}$ and the decoupling output $m_{αβ\_D}$ together to obtain $m_{αβ\_RD}$ as an input of a delay compensation link, and calculating a total output $m_{αβ}$ of the control link; and performing αβ/abc coordinate transformation on the total output map of the control link to obtain three phase modulating waves $m_a$, $m_b$ and $m_c$, and comparing the three phase modulating waves with carrier waves in a modulating and driving module to generate a driving signal to drive converting topology, thereby realizing electric energy conversion.

2. The resonance control method for differentiated phase correction according to claim 1, wherein the calculating formula of the decoupling link is as follows:

$$m_{αβ\_D}=i_{αβ}\cdot jω_0L,$$

wherein L is an inductance value on an alternating current side.

3. The resonance control method for differentiated phase correction according to claim 1, wherein the calculating formula of the delay compensation link is as follows:

$$m_{αβ}=m_{αβ\_RD}\cdot e^{jnT_s\cdot ω_0},$$

wherein n is a compensation coefficient and $T_s$ is a control period.

4. The resonance control method for differentiated phase correction according to claim 1, wherein the calculating formula of the delay compensation link is as follows:

$$m_{\alpha\beta} = m_{\alpha\beta\_RD}.$$

* * * * *